June 20, 1967  R. G. DUNNING  3,326,897
PRODUCTION OF ALKYLENE IMINES
Filed April 26, 1965  2 Sheets-Sheet 2

INVENTOR.
RANALD G. DUNNING
BY

AGENT

United States Patent Office 3,326,897
Patented June 20, 1967

3,326,897
PRODUCTION OF ALKYLENE IMINES
Ranald G. Dunning, Westfield, N.J., assignor to Chemirad Corporation, East Brunswick, N.J., a corporation of Delaware
Filed Apr. 26, 1965, Ser. No. 456,600
11 Claims. (Cl. 260—239)

This application is a continuation in part of application Serial No. 184,098, filed April 2, 1962, and of copending application Serial No. 208,414, filed July 9, 1962, both entitled "Process of Producing Alkylene Imines," and both now abandoned.

The present invention relates to a new and improved process for producing an alkylene imine by reaction of a 2-amino alkanol sulfuric acid ester with an inorganic base in aqueous solution. The reaction to produce an alkylene imine from an amino ethanol sulfuric acid ester and sodium hydroxide is a relatively complex and difficult reaction inasmuch as it must involve a molecular rearrangement and a delicate ring closure to yield the desired ethylene imine. Moreover, since this compound is highly reactive and polymerizable, conditions must be devised to preclude polymerization and insure a high yield of monomer. These objects are obtained in accordance with the process of the invention.

The prior art methods are fraught with difficulties and are, in general, unsatisfactory to achieve high yields of an alkylene imine. There is, therefore, a serious need for an efficient method for making alkylene imines on a continuous basis.

One of the shortcomings encountered in techniques for preparing alkylene imines is that the product is obtained as a dilute solution of the alkylene imine in water, for instance, a 5% to 15% solution. Since this is not concentrated enough for further use directly in polymerization, the product is then concentrated by salting out, i.e., by displacing the alkylene imine from its solution by the addition of sodium hydroxide, or by extractive distillation counter-currently to a flow of concentrated aqueous sodium hydroxide, with or without the addition of sodium hydroxide to the distillant.

In view of the shortcomings of the procedures of the prior art, attempts have been made to improve the yield and the purity of the product. It has been suggested that the rate at which the alkali metal salt of 2-amino alkanol sulfuric acid ester is heated in contact with excess base controls both the purity as well as the yield of the resulting alkylene imine. It has been suggested therefore to minimize the contact time between the heated neutralized amino-alkyl hydrogen sulfate with excess base by heating the solution of the salt in contact with the base substantially instantaneously from about room temperature to a temperature above the boiling point of the alkylene imine to vaporize the imine as rapidly as it is formed and thereby prevent further contact between the imine and the unreacted mixture or the base. Even under such conditions at most only a 17% concentration of ethylene imine is obtainable under conditions where essentially quantiative yields are sought to be obtained.

It has also been attempted to add a slurry of amino ethanol sulfuric acid ester in water slowly to a boiling solution containing 20% of sodium hydroxide. The distillate is caused to enter a column, counter-curerntly to a flow of a 33% sodium hydroxide solution, and is then subjected to extractive distillation. This process has the serious disadvantages attendant the feeding of a slurry to the reaction mixture because of the tendency of the solid material to settle rapidly. Furthermore, such a process is not suitable to large scale production because the throughput per time unit is inadequate. Furthermore, the conditions under which reaction takes place are such that rapid disengagement of the ethylene imine from the reaction mixture is not possible. Other conventional procedures all have such serious shortcomings as to preclude their utilization on an industrial scale.

It is one object of the present invention to provide a highly efficient process of producing an alkylene imine from the corresponding amino alkanol sulfuric acid ester by reaction with alkali metal hydroxide solution under a combination of specific conditions. Another object of the present invention is to provide a continuous process which is highly efficient in producing a high yield of the desired alkylene imine in high concentration, in essentially quantiative yield and essentially in the absence of any undesirable byproducts. Other objects and advantageous features of the present invention will become apparent as the description proceeds.

In accordance with the invention there is provided a process which comprises making a solution of a suitable amino alkanol sulfuric acid ester in an alkali metal hydroxide solution. The solution is fed to the top of a suitable reaction zone. The solution of the amino alkanol sulfuric acid ester in alkali metal hydroxide solution is heated during its passage down the reaction zone by water vapors rising through the reaction zone after their formation in a suitable heating zone. The amino alkanol sulfuric acid ester in the alkali solution reacts to form the alkylene imine. Under these conditions there is provided for the initial rapid disengagement of vapors of the alkylene imine formed and of water vapors. The vapors formed rise through the column counter-currently to the stream of descending amino alkanol sulfuric acid ester solution in alkali.

It is an important aspect of the invention that the process provides an intimate and sustained contact zone and time between the rising vapors of alkylene imine and water vapors and downwardly moving ester in alkali solution. Advisably the residence time of the liquid reactant in the reaction zone through which the vapors of alkylene imine are ascending vary from about 0.5 to about 2.5 hours, from about 1.5 hours to about 2.5 hours being quite satisfactory residence time period when operating at atmospheric pressure. When the process of the invention is carried out at under pressure higher than atmospheric, the lower ranges of the residence time are more desirable. It is an unusual aspect of the invention that notwithstanding the intimate contact between the alkylene imine vapors and the alkaline reactant, there is obtained a high yield of concentrated monomeric product.

It has also been found in accordance with the invention that it is highly desirable that the total water input into the reaction system be maintained in the range of about 3 to about 4 part by weight per part of amino alkanol sulfuric acid ester.

It has been further found that improved yields are obtained using an alkali metal hydroxide to amine alkanol sulfuric acid ester molar ratio of between 2.0 to 1 and 2.5 to 1, with a preferred range of between 2.2 and 2.5 moles of alkali metal hydroxide to one mole of amino alkanol sulfuric acid ester.

In accordance with the invention, the reaction may be carried out at a temperature in the range of about 110° to about 160° C., particularly a range from about 120° to about 145° C. is quite desirable. An especially advantageous temperature range is from 130° to 145° C. It is a further advantageous aspect of the process that a temperature in the range of about 110° to 160° C. or even higher can be used, under pressure, to obtain high yield of monomeric alkylene imine. The process may be carried out under atmospheric pressure, even more advantageously, if desired, under increased pressures in the range of about 5 p.s.i. to about 50 p.s.i., advantageously in the range of 25 to 40 and more particularly in the range of about 30 to 37 p.s.i.

An advantage of the process of the invention is that a solution of the amino alkanol sulfuric acid ester in alkali metal hydroxide solution is employed and that the process permits easy and rapid removal of the alkylene imine produced. Moreover, a distinguishing aspect of the process over the prior art is that the process permits the recovery of a concentrated alkylene imine product. The alkylene imine product has a concentration of at least about 25% and quite commonly over about 30%.

Another significant advantage of the process is that it provides a larger throughput per unit volume of reactor or reaction equipment.

The new process may be carried out as a batch process. The preferred procedure, however, is a continuous operation. In continuous operation, in accordance with the process, the sodium sulfate is removed as a solution from the reaction zone. In the batch process, the sodium sulfate may crystallize and be kept in suspension by a suitable agitator until the batch is completed, at which time the crystalline slurry may be discharged.

The attached drawings illustrate apparatus which can advantageously be used for carrying out the process according to the present invention. In the drawings.

It is, of course, understood that the present invention is not limited to such apparatus but that the process may be carried out in other equipment of a similar nature which permits following the principles set forth hereinabove and in the claims annexed hereto.

Figure 1:
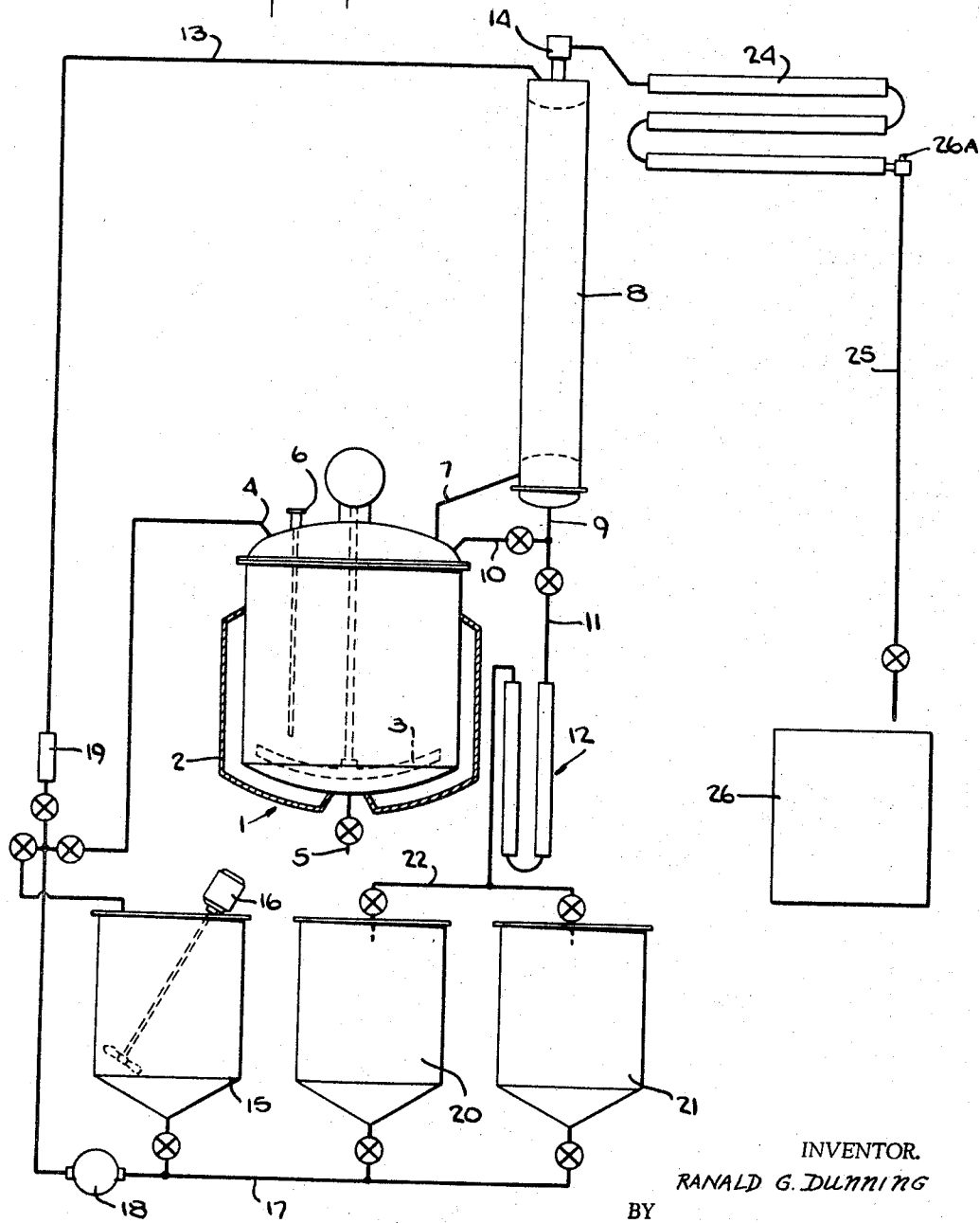
FIG. 1 illustrates an apparatus suitable for a batch process.

In FIG. 1, still 1 is provided with steam jacket 2, stirring device 3 with motor, inlet 4 for the initial charge of reactants, and bottom outlet 5 for withdrawing residual alkali metal sulfate, water, and byproducts, thermometer or thermocouple 6, and vapor outlet 7 connecting still 1 with column reactor 8. This column reactor is provided with bottom outlet 9 which has two branches, one branch 10 leading back into still 1, and the other branch 11 leading to heat exchanger 12. Column 8 is provided at its top with inlet pipe 13 and vapor outlet 14. Inlet pipe 13 is connected with feed tank 15 with agitating device 16. In the feed tank the solution of amino alkanol sulfuric acid ester in alkali metal hydroxide solution is prepared and may be conducted through pipe 17, pump 18, and flow meter 19 to the top of column 8. Pipe 17 is branched and connected through pipe 4 to still 1. Tank 20 contains the scrubbing solution, for instance, sodium hydroxide solution which may also be pumped through pipe 17 and pump 18, flowmeter 19, and pipe 13 into column 8, as will be described hereinafter. Tank 21 is used as storage tank for used scrubbing solution. Both tanks 20 and 21 are connected by pipe 22 with heat exchanger 12 to receive the used scrubbing solution. Tank 21 is connected with pump 18 and pump 23 to allow for the transfer of the used scrubbing solution for use as "make-up" solution in tank 15 for a succeeding batch. Vapor outlet 14 of column 8 is connected to condenser 24 where the vapors of alkylene imine and water are condensed. The condensate flows through pipe 25 into the crude distillate receiver 26, from where it may subsequently be removed and used as such or may be distilled fractionally to yield the pure monomer. Pipe 25 is provided with vent 26A. Column 8 is similar to the design of a conventional fractioning column. Thus it may contain bubble cap plates, sieve plates, or it may be a cascade column or a ring packed column, or it may be packed with Berl saddles, or with any other suitable packing material.

Figure 2:
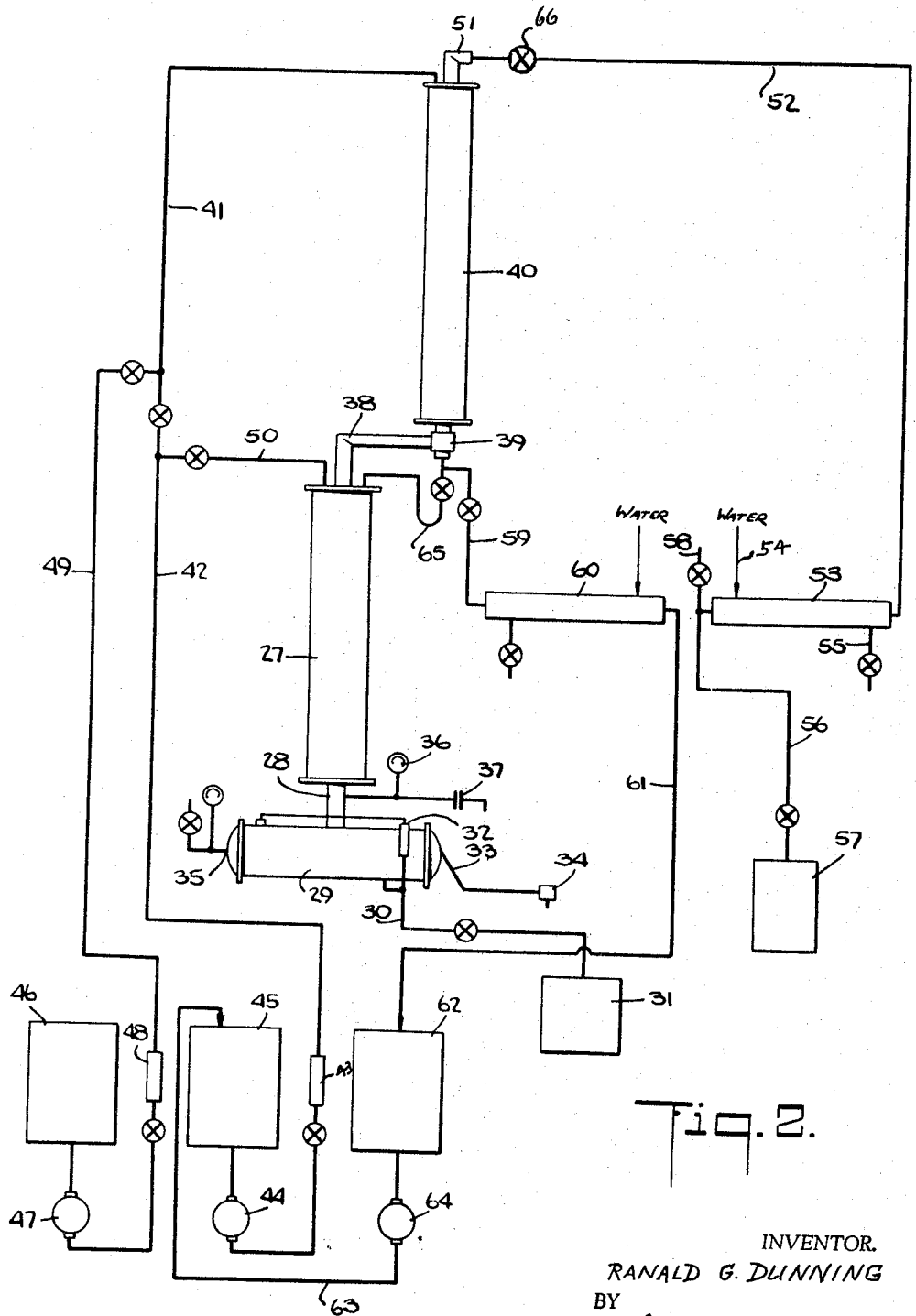
FIG. 2 illustrates an apparatus suitable for continuous operation.

In FIG. 2, main reactor column 27 has an outlet which has a connection 28 for vapor and liquid flow from and to reboiler 29 which is heated either directly or indirectly and is provided with outlet 30 for discharging spent reaction liquid into receiver 31. Liquid level gauge 32, condensate outlet 33, and trap 34 as well as steam inlet 35 are provided in said reboiler. Connection 28 has a pressure gauge 36 and a safety rupture disc 37. The top of column 27 is connected with connection 38 to liquid trap 39 which is then connected with enriching column 40. Both columns 27 and 40 are insulated to prevent loss of heat. The top of column 40 is connected by pipes 41 and 42, flow meter 43, and pump 44 with feed tank 45 which contains the solution of the amino alkanol sulfuric acid ester and alkali metal hydroxide. Scrubbing solution tank 46 is connected through pump 47, flow meter 48, and pipe 49 with pipe 41 leading to column 40. Pipe 42 is branched and leads through pipe 50 into the top of column 27. Column 40 has a vapor outlet 51 which leads through pressure reducing valve 66 and pipe 52 to a condenser 53 with water inlet 54 and water outlet 55. The condensed alkylene imine plus water are conducted through pipe 56 to product receiver 57. Pipe 56 is connected with vent 58 which may be closed when operating under pressure. Liquid trap 39 is connected by pipe 59 with heat exchanger 60 leading through pipe 61 to the used scrubbing solution tank 62 which in turn is connected through pipe 63 and pump 64 to feed tank 45. Liquid trap 39 is valved so as to permit discharge either to heat exchanger 60 or to column 27 through pipe 65. It is evident that the apparatus is arranged in such a manner that it can be operated in three ways, namely:

(a) The solution of reactants is conducted from feed tank 45 through pipes 42 and 41 to the head of column 40. In this case trap 39 discharged liquid from column 40 directly into column 27.

(b) The solution of reactants is conducted through pipe 42 and 50 to the head of column 27 while, simultaneously, scrubbing solution is conducted from tank 46 through pipes 49 and 51 to the head of column 40. Liquid trap 39 is adjusted in such a manner that the liquid from column 40 is directly discharged into column 27 so that feed solution as well as scrubbing solution is charged into column 27.

(c) The feed solution is conducted from tank 45 through pipe 42 and 50 to column 27 and the scrubbing solution is conducted from tank 46 through pipes 49 and 41 to column 40. Liquid trap 39 is adjusted in such a manner that the scrubbing solution is conducted through pipe 59 to heat exchanger 60 and from there through pipe 61 to used scrubbing solution tank 62 from where it would be used for make-up of additional feed solution in feed tank 45. It is, of course, understood that preferably two feed tanks are provided in order to avoid interruption of the process. Columns 27 and 40 may contain bubble cap plates, sieve plates, or the like or they may be packed with rings or other conventional material. Preferably column 27 is a bubble cap plate or similar column while column 40 is a ring packed column although the columns may be of any suitable construction.

The column reactor described in FIG. 2 may be operated at atmospheric pressure, in which case pressure reducing valve 66 is used in the full-open position, or under pressure in either of two modes:

(a) with pressure reducing valve 66 full-open and the entire system, including condenser 53 and product receiver 57 under pressure, or (b) with pipe 52, condenser 53, pipe 56, and product receiver 57 at atmospheric pressure, vent line 58 being open to the atmosphere, and pressure reducing valve 66 being operated so as to maintain operating pressure on the balance of the column reactor, i.e., columns 40 and 27, reboiler 29, and their related feed and connecting lines.

In operations involving the apparatus described in FIG. 1 in which the used scrubbing solution is diverted from the bottom outlet of column 8 to used scrubbing solution tank 21, this solution may be recycled to the head of column 8 to provide additional scrubbing action prior to its use for make-up of a succeeding batch. In a like manner, the used scrubbing solution which may be collected in tank 62, when, operating with the apparatus described in FIG. 2, may be recycled to the head of column 40.

The following examples illustrate the manner in which the process according to the present invention is carried out by using the apparatus described in the attached drawings without, however, limiting the same thereto.

*Example 1*

There are charged 300 lbs. of amino ethanol sulfuric acid ester (96.5%) and 770 lbs. of sodium hydroxide solution into feed tank 15 and stirred to effect solution of the ester. There are then charged 640 lbs. of 25% sodium hydroxide solution to scrubbing solution tank 20. Three hundred and sixty lbs. of 11% sodium hydroxide solution are introduced into still 1. One hundred and fitfy lbs. of reactant solution are pumped into still 1 from tank 15 through pipe 17, pump 18, and pipe 4. The still is then heated at a temperature of 130° C. at which time a distillate starts to come over through vapor outlet 14. The reactant solution is then pumped from tank 15 through pipe 13 to the top of column 8 at the uniform rate of 310 lbs. per hour. Column 8 is filled with ½ inch Raschig rings. The column has a packed height of about 9 feet and a diameter of about 12 inches and is insulated against loss of heat. The feed solution proceeds down the column against rising vapors of ethylene imine and water generated in the column and in still 1. Vapors are condensed in condenser 24. Feeding of the reactant solution is completed after about 2 hours; the liquid passing through column 8 enters the still through pipes 9 and 10. After 2 hours, i.e., after all the reactant solution has been pumped into column 8, pipe line 10 is closed and scrubbing solution is pumped from tank 20 through pipe 13 into the column against the rising vapors of ethylene imine and water generated in still 1. The scrubbing solution is discharged through pipes 9 and 11 to heat exchanger 12 and passes from there through pipe 22 into receiver tank 21. The scrubbing solution is passed through column 8 at the rate of 195 lbs. per hour. Thereafter the reaction is complete and the still residue is discharged through pipe 5 for recovery of sodium sulfate. The yield of the aqueous ethylene imine solution collected in receiver 26 is 322 lbs. This solution consists of a 16.4% ethylene imine solution. The yield is about 64% of the theoretical yield. The scrubbing solution in tank 21 is pumped into tank 15 where it is used as make-up for the next charge.

In a number of similar batches it was found that the total yield of ethylene imine is between about 60% and about 70% and averaged about 65% of the theoretical yield.

*Example 2*

A solution of 40 lbs. of sodium hydroxide (100%) in 70 lbs. of water was added to the still of the apparatus described in FIG. 1. A solution of 80 lbs. of 2-methyl amino ethanol sulfuric acid ester (93% assay) and 40 lbs. of sodium hydroxide (100%) in 140 lbs. of water was prepared. Fifty lbs. of this feed solution was placed in the still which was heated to boiling. The remainder of the feed solution was fed to the top of the column following the procedures outlined in Eaxmple 1 over a period of 115 minutes. Upon completion of addition of the feed solution, a scrubbing solution consisting of a 25% solution was pumped to the top of the column at a rate of 53 lbs. per hour for three hours.

The distillate yielded 82.5 lbs., assaying 27.4% 2-methyl ethylene imine.

*Example 3*

A solution of 40 lbs. of sodium hydroxide (100%) in 120 lbs. of water was added to still 1 of the apparatus described in FIG. 1. A solution of 345 lbs. of 2,2-dimethyl amino ethanol sulfuric acid ester (assay 93%) and 160 lbs. of sodium hydroxide (100%) in 560 lbs. of water was prepared and 200 lbs. of this solution were added to the still. The charge was heated to boiling. The remainder of the solution was pumped to the top of the column following the procedures outlined in Example 1 over a period of two hours. Upon completion of the addition of the feed solution, 640 lbs. of a 25% sodium hydroxide solution were fed to the top of the column over a period of three hours. The distillate obtained weighed 390 lbs., assaying 31.1%, 2,2-dimethyl ethylene imine equivalent to a yield of 89% of the theoretical yield.

*Example 4*

A solution of 8 lbs. of sodium hydroxide (100%) in 70 lbs. of water was added to still 1 of the apparatus described in FIG. 1. A feed solution of 78.5 lbs. of N-methyl amino ethanol sulfuric acid ester (assay: 80%) and 36 lbs. of sodium hydroxide (100%) in 120 lbs. of water was prepared. Forty-seven lbs. of this feed solution was placed in the still and the remainder charged to the top of the reactor column over a period of 90 minutes following the procedure outlined in Example 1. Upon completion of addition of the feed solution, a scrubbing solution, consisting of an aqueous 25% sodium hydroxide solution was pumped to the head of the reactor column at the rate of 70 lbs. per hour. The distillate from this reaction yielded 16.9 lbs. of N-methyl ethylene imine, corresponding to 67% of the theoretical yield. Its concentration was 72.5%.

*Example 5*

A feed solution composed of 2,028 g. of N-ethyl amino ethanol sulfuric acid ester (assay: 57.2%), 2,400 g. of an aqueous 50% sodium hydroxide solution, and 1,500 g. of water was prepared. Using a laboratory apparatus comparable to the equipment shown in FIG. 1, the reaction was carried out by proceeding as described in Example 1.

Four hundred and eighty-five g. of a product containing 77.6%, by weight, of N-ethyl ethylene imine were obtained. This yield corresponds to 92% of the theoretical yield. The concentration of the distillate was 97.6%.

*Example 6*

Feed tank 45 is charged with a solution of 13.1% of sodium hydroxide and 18.4% of amino ethanol sulfuric acid ester in water. This solution is continuously pumped through pump 44, flowmeter 43, pipe 42, and pipe 41 to the head of column 40 at the rate of 23.1 lbs. Over a period of 10 hours and 45 minutes a total of 76.4 lbs. of distillate was collected in product receiver 57. This distillate contained 10.05 lbs. of ethylene imine. The yield thus was about 82% of the theoretical yield. The temperature at the vapor outlet 51 was about 100° C., the temperature in the reboiler 29 was about 110° C. The bottoms in receiver 31 consisted of a sodium sulfate solution which does not crystallize above 35° C.

Column 40 used in this experiment was filled with one quarter inch Raschig rings. The total packed height was 68 inches with a diameter of 3 inches.

Column 27 is a bubble cap plate column provided with 10 plates spaced about 8 inches apart from each other. The column has a diameter of 8 inches, the liquid depth, i.e., the overflow weir in the plates is about 4 inches.

It is a feature of the present invention that such deep plates are provided in order to maintain the required retention time between the reactants and the ethylene imine. Equivalent results can also be achieved by providing more plates of less depth. The liquid depths on the plates in the reaction column may vary between one inch and eight inches and preferably between theree inches and six inches.

*Example 7*

In the apparatus described in FIG. 2 and by proceeding according to Example 6, a feed solution consisting of 7.58% of sodium hydroxide and 26.4% of amino ethanol sulfuric acid ester in water was pumped continuously from tank 45 through pump 44, flowmeter, 43, pipe 42, and pipe 50 to the top of reactor column 27, at the rate of 17.2 lbs. per hour. Simultaneously, a solution of 25% sodium hydroxide in water was pumped at the rate of 7.8 lbs. per hour from tank 46 through pump 47, flowmeter 48, pipe 49, and pipe 41 to the top of column 40. The valves on liquid trap 39 were adjusted so as to discharge the flow from column 40 to column 27. Over a period of 12 hours, 49.4 lbs. of a solution containing 24.4% ethylene imine in water were collected in product receiver 57. The yield was thus about 85% of the theoretical yield.

*Example 8*

In the apparatus described in FIG. 2 and proceeding according to Example 6, a feed solution consisting of 13.1% of sodium hydroxide and 18.5% of amino ethanol sulfuric acid ester in water was pumped continuously from tank 45, to the top of reactor column 27, at the rate of 24.9 lbs. per hour. Simultaneously, a solution of 25% of sodium hydroxide in water was pumped at the rate of 11.7 lbs. per hour from tank 46 to the top of column 40. The valves on liquid trap 39 were adjusted so as to discharge the flow of used scrubbing solution from column 40 through pipe 59, heat exchanger 60, and pipe 61 to tank 62. Over a period of 10 hours, 36.5 lbs. of a solution containing 29.5% ethylene imine were collected in product receiver 57. The yield was about 85% of the theoretical yield.

*Example 9*

In the apparatus described in FIG. 2, vent 58 was closed, receiver 57 was replaced by a pressure receiver and valve 66 was set and maintained in the full-open position. Reboiler 29 was heated to maintain a vapor pressure of 25 p.s.i. as measured by gauge 36. A feed solution consisting of 26.8% of amino ethanol sulfuric acid ester and 7.65% of sodium hydroxide was pumped from feed tank 45 through pump 44, flowmeter 43, pipe 42, and pipe 50 to the top of column 27 at the rate of 31.6 lbs. per hour. Simultaneously, a solution of 25% sodium hydroxide was pumped from tank 46 through pump 47, flowmeter 48, pipe 49, and pipe 41 to the top of column 40. The valves on trap were adjusted so as to discharge the flow from column 40 to column 27. Over a period of 11 hours, a total of 73.2 lbs. of a solution containing 30.2% of ethylene imine were collected in the pressure receiver. The yield was thus about 87% of the theoretical yield.

*Example 10*

In the apparatus described in FIG. 2, pressure relief valve 66 was operated so as to maintain 25 p.s.i. pressure on the system, as measured by gauge 36; vent 58 was open and the receiver 57, condenser 53, and connecting pipes were maintained at atmospheric pressure. In an operation similar to that described in Example 9, essentially the same results were obtained.

*Example 11*

(a) There is charged a solution containing 24.3% of amino ethanol sulfuric acid ester and 7.04% sodium hydroxide from a feed tank to the top of a reaction column at a rate of 66.8 lbs. per hour. Simultaneously a solution of 26.7% of sodium hydroxide is pumped to the top of a scrubbing column at a rate of 22.2 lbs. per hour. The temperature in the reaction column is maintained in the range of 138° to 140° C. and at the top of the scrubbing column at about 130° to 138° C. The process was operated under a pressure in the range of 32 to 35 p.s.i. Over a period of 5½ hours a total of 72.3 lbs. of a solution containing 32.3% of ethylene imine was collected in a receiver. The yield was 85.7% of theoretical.

(b) The process described section (a) is repeated, maintaining the pressure in the range of 35 to 40 p.s.i. Equivalent results and a satisfactory yield of ethylene imine are obtained.

(c) The process described under section (a) is repeated, maintaining the pressure in the range of about 25 to 35 p.s.i. Equally satisfactory yields are obtained. The temperature in the scrubbing column was maintained in the range of 120° to 140° C.

The process according to this invention utilizes, in contrast to other known apparatus, low pressure equipment of a design to permit immediate separation of the ethylene imine from the reaction mixture. The major portion of the reaction occurs within the bubble cup plate column while the ring-packed column is available for such concentration of the monomer as may be desired. Ethylene imine concentrations of 10–80% or higher are available from the single piece of equipment operating in accordance with the process of the invention. The ethylene imine-water distillate, when obtained as a 20–30% solution, may be used directly for polyethylene imine preparation.

Of course, many changes and variations in the composition of the reactants, the reaction conditions, temperature, duration, and pressure, the method of recovering the reaction products and of separating therefrom the resulting alkylene imines, the apparatus used for carrying out the reaction, and the like may be made by those skilled in the art inaccordance with the principles set forth herein and in the claims annexed hereto.

I claim:
1. A continuous process for making a 1,2-alkylene imine which comprises
    feeding to the top of an extended reaction zone a solution of 1,2-amino alkanol-2-sulfuric acid ester in an aqueous alkali metal hydroxide solution, said alkali metal hydroxide being present in an amount of from 2.2 to 2.5 moles for each mole of the alkanol ester,
    reacting, while heating at a temperature of from 110° to 160° C., the ester with the metal hydroxide while the reactants are moving downwardly in intimate and sustained contact with each other and with rising vapors of ethyleneamine and water, the rates being such as to provide a residence time of from 0.5 to 2.5 hours, the concentration of reactants being such as to provide a ratio of water to amino ethanol sulfuric acid ester from about 3 to about 4 parts per part, by weight, and
    separating at the bottom of the reaction zone liquid alkali metal sulfate solution and, at the top of the column the 1,2-alkylene imine product.

2. The process of claim 1 in which the vapor of alkylene imine formed is passed upwardly through a downward flow of an alkali metal hydroxide solution.

3. The process of claim 1 in which the alkali metal hydroxide is sodium hydroxide.

4. The process of claim 1 in which the ester is amino ethanol sulfuric acid ester and the product is ethyleneimine.

5. The process of claim 1 in which the ester is 2-methyl amino ethanol sulfuric acid ester and the product is 2-methyl ethylene imine.

6. The process of claim 1 in which the ester is 2,2-dimethyl amino ethanol sulfuric acid ester and the product is 2,2-dimethyl ethylene imine.

7. The process of claim 1 in which the ester is N-methyl amino ethanol sulfuric acid ester and the product is N-methyl ethylene imine.

8. The process of claim 1 in which the ester is N-ethyl amino ethanol sulfuric acid ester and the product is N-ethyl ethylene imine.

9. The process of claim 1 wherein the reaction is carried out under a pressure of from 5 to 50 lbs. per square inch.

10. The process of claim 1 wherein the reaction is carried out at a temperature of from about 130° to 145° C.

11. The process of claim 1 wherein the rates of reactant addition are such as to provide a residence time of from 1.5 to 2.5 hours.

References Cited
UNITED STATES PATENTS
| | | | |
|---|---|---|---|
| 2,636,880 | 4/1953 | Reeves et al. | 260—239 |
| 2,695,870 | 11/1954 | Otto | 202—153 |

OTHER REFERENCES
Thurston, FIAT Final Report No. 960, Oct. 10, 1945, pp. 1–7.

ALEX MAZEL, *Primary Examiner.*

ALTON D. ROLLINS, *Assistant Examiner.*